SHIFTING REGISTER UTILIZING MAGNETIC AMPLIFIERS

Filed May 21, 1954 4 Sheets-Sheet 1

LEGEND

INVENTOR.
HENRY WILLIAM KAUFMANN
BY
ATTORNEY

SHIFTING REGISTER UTILIZING MAGNETIC AMPLIFIERS

Filed May 21, 1954 4 Sheets-Sheet 2

INVENTOR.
HENRY WILLIAM KAUFMANN

ATTORNEY

SHIFTING REGISTER UTILIZING MAGNETIC AMPLIFIERS

Filed May 21, 1954

4 Sheets-Sheet 3

INVENTOR.
HENRY WILLIAM KAUFMANN
BY
ATTORNEY

May 6, 1958 H. W. KAUFMANN 2,834,006

SHIFTING REGISTER UTILIZING MAGNETIC AMPLIFIERS

Filed May 21, 1954 4 Sheets-Sheet 4

INVENTOR.
HENRY WILLIAM KAUFMANN
BY
ATTORNEY

United States Patent Office 2,834,006

Patented May 6, 1958

2,834,006

SHIFTING REGISTER UTILIZING MAGNETIC AMPLIFIERS

Henry William Kaufmann, Phoenixville, Pa., assignor, by mesne assignments, to Sperry Rand Corporation, New York, N. Y., a corporation of Delaware Application May 21, 1954, Serial No. 431,509

20 Claims. (Cl. 340—174)

The present invention relates to shifting registers and is more particularly concerned with such devices employing magnetic amplifiers rather than vacuum tube elements.

The shifting register comprises a basic component in many present-day computing apparatuses for instance, and is used to obtain, for example, either a physical translation of information signals within such an apparatus, or is used for obtaining a predetermined or variable time delay. The best known types of such registers comprise a chain of bistable devices selectively responsive to external shift signals whereby upon application of such a shift signal the state of operation of one of the said bistable devices is transferred to the next bistable device in the said chain.

In the past, such shifting registers have normally utilized vacuum tube circuitry in the construction of the several bistable stages, and the use of such circuitry has been accompanied by the disadvantages that the shifting register was relatively large in size; was subject to breakage; and subject to normal operating failures. These foregoing factors raise serious questions of disposition of components as well as of maintenance and the cost attendant thereto. In order to reduce failures due to the foregoing difficulties, other forms of electrical devices have been suggested for use in shifting registers, and one such other form is the magnetic amplifier. It is with this particular type of component that the present invention is primarily concerned.

It is accordingly an object of the present invention to provide a novel shifting register utilizing magnetic amplifiers as basic components thereof.

A further object of the present invention resides in the provision of a shifting register which is both inexpensive to construct and which exhibits considerable ruggedness.

A still further object of the present invention resides in the provision of a shifting register which can be made in relatively small sizes.

A still further object of the present invention resides in the provision of a shifting register utilizing a chain of bistable devices comprising magnetic amplifiers.

Still another object of the present invention is the provision of a shifting register comprising an interconnected chain of bistable stages, each of said stages utilizing a non-complementing magnetic amplifier, a device providing a delayed feedback from the output to the input of the said magnetic amplifier, and a gating network. In this respect, the delay in accordance with my present invention may be effected by a further magnetic amplifier.

A still further object of the present invention resides in the provision of a shifting register utilizing magnetic amplifiers in conjunction with a control signal network whereby the shifting register may be operated to clear all stages simultaneously, or to shift information from one stage to the next succeeding stage as may be desired.

The foregoing objects are achieved in the present invention by the provision of a plurality of magnetic bistable devices interconnected to form a shifting register chain. In one form of the present invention the bistable devices forming basic components of the shifting register comprise non-complementing magnetic amplifiers having a network utilizing a gate and a delay means for selectively feeding back energy from the output of the said non-complementing magnetic amplifier to the input thereof. It should be noted that a non-complementing amplifier is by definition one which will give an output only when an input is presented thereto. In the practice of the foregoing form of my invention, the several bistable devices comprising the shifting register chain are interconnected through transfer gates and the shift input is coupled both to these interconnecting transfer gates and to the gates in the feedback paths of each of the bistable stages. The bistable stage exhibits two stable states of operation, namely, one in which an information pulse recirculates from the output of the non-complementing amplifier to the input thereof and a second stable state in which no such recirculation occurs. A shift input, accordingly, causes information transfer from a recirculating stage to the next succeeding stage by breaking the feedback path of the said recirculating stage, thus causing the said stage to revert to its other stable state, and also by opening the transfer gate connecting the said recirculating stage to the next succeeding stage whereby a transfer of information will occur through the said interconnecting transfer gate.

In still another form of my invention, the aforesaid delay is effected by a further non-complementing magnetic amplifier. The present invention also contemplates a control pulse network whereby either clear pulses may be applied to clear each of the bistable stages simultaneously (by closing the recirculation gate of each of the stages), or wherein a shift pulse input may be so applied as to clear a recirculating stage, and to transfer information from the said stage to the next succeeding stage simultaneously. In this latter control pulse network, I also contemplate the use of a complementing magnetic amplifier, and in this respect it should further be noted that a complementing amplifier is by definition one which will give an output when no input is presented thereto, or on the contrary, one which gives no output when there is in fact an input.

Before proceeding with a detailed description of my invention, several further definitions of the subject matter to be discussed are advisable. The several amplifiers comprising the bistable devices of my shifting register, are energized by "power pulses." These pulses are preferably in the form of regularly occurring positive and negative going square waves. In the precise disposition of components, some amplifiers will be fed by "phase 1 power pulses" and this term merely refers to such positive and negative going square waves timed with respect to an arbitrary datum. Other of the amplifiers will utilize "phase 2 power pulses" and it is to be understood that this latter term again refers to pulses of the same form as phase 1 power pulses timed again with respect to the same arbitrary datum, but so displaced with respect to said datum that a positive going portion of a phase 1 power pulse will coincide with a negative going portion of a phase 2 power pulse and vice versa. Again, it will become apparent from the following description that the several power pulses cooperate with input pulses to selectively produce or inhibit an ouput from the magnetic amplifier concerned. These input pulses must occur during a negative going portion of the corresponding power pulse applied to the said amplifier, and in this respect therefore when I speak of a "phase 1 input pulse" it is to be understood that this term refers to an input pulse occurring during a negative going portion of a phase 1 power pulse. Similarly, a "phase 2 input pulse" is one which occurs during a negative going portion of a phase 2 power pulse. A phase 1 input pulse cannot effectively cooperate with a phase 2 power pulse, nor can a phase 2 input pulse effectively cooperate with a phase 1 power pulse.

The foregoing objects, advantages and operation of my invention will become more readily apparent from the following description and accompanying drawings, in which.

Figure 1:
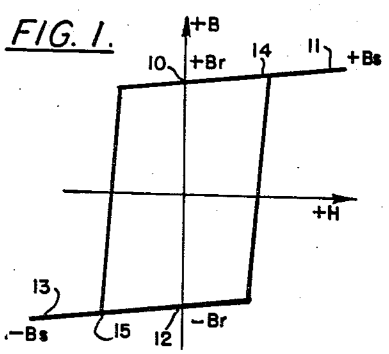
Figure 1 is an idealized hysteresis loop of a magnetic material which may preferably be employed in the cores of the magnetic amplifiers utilized in my invention.

Referring now to Figure 1, it will be seen that the magnetic amplifiers of my invention may preferably, but not necessarily, utilize magnetic cores exhibiting a substantially rectangular hysteresis loop. Such cores may be made of a variety of materials, among which are various types of ferrites and various kinds of magnetic tapes including Orthonik and 4–79 Moly-Permalloy. These materials may be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores, nor to any specific materials therefor; and the examples to be given are illustrative only.

In the following description bar type cores have been utilized for ease of representation and for facility in showing winding directions. The bar type cores shown may in fact be considered to represent the end view of a toroidal core. Further, the following description refers to the use of materials having substantially rectangular hysteresis loops; this is again for ease of discussion. However, neither the precise core configuration or the precise hysteretic character of core material is mandatory; and many variations will readily suggest themselves to those skilled in the art.

Returning now to the hysteresis loop shown in Figure 1, it will be noted that the curve exhibits several significant points of operation, namely, point 10 (plus B*r*) which represents a point of plus remanence; the point 11 (plus B*s*) which represents plus saturation; the point 12 (−B*r*) which represents minus remanence; the point 13

Figure 6:
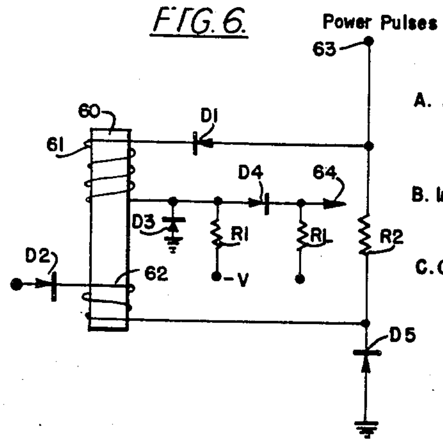
Figure 6 is a schematic representation of a basic complementing amplifier of the magnetic type.

(−B*s*) which represents minus saturation; the point 14 which represents the beginning of the plus saturation region; and the point 15 which represents the beginning of the minus saturation region. Discussing for the moment the operation of the device utilizing a core which exhibits a hysteresis loop such as is shown in Figure 1, let us assume that a coil is wound on the said core. If we should initially assume that the core is at an operating point 10 (plus remanence) and if a voltage pulse should be applied to the coil tending to produce in the said coil a current in such a direction as to create a magneto-motive force in the said core in a direction of plus H, that is, in a direction tending to increase the flux in the said core in the same direction, the core will tend to be driven from point 10 (plus B*r*) to point 11 (plus B*s*). During this state of operation there is relatively little flux change through the said coil and the coil therefore presents a relatively low impedance whereby energy fed to the said coil during this state of operation will pass readily therethrough and may be utilized to effect a usable output. On the other hand, if the core should initially be at point 12 (−B*r*) prior to the application of the said plus H pulse, upon application of such a pulse the core will tend to be driven from the said point 12 (−B*r*) to the region of point 11 (plus saturation). The pulse should preferably be selected so as to drive the core only to the beginning of the plus saturation region, point 14. During this particular state of operation there is a very large flux change through the said coil and the coil therefore exhibits a relatively high impedance to the applied pulse. As a result, substantially all the energy applied to the coil, when the core is initially at −B*r*, will be expended in flipping the core from point 12 to the region of plus saturation, preferably to point 14, and thence to point 10, with very little of this energy actually passing through the said coil to give a usable output, if the said pulse be selected as above. Thus depending upon whether the core is initially at point 10 (plus B*r*), or at point 12 (−B*r*), an applied pulse in the plus H direction will be presented respectively with either a low impedance or a high impedance and will effect either a relatively large output or a relatively small output. These considerations are of great value in the construction of the magnetic amplifiers utilized in the present invention, such as are shown in Figures 2 and 6.

Figure 2:
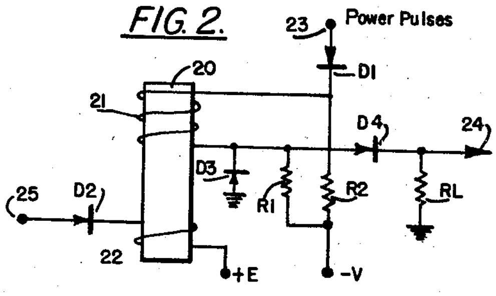
Figure 2 is a schematic representation of a basic non-complementing amplifier of the magnetic type.
Figure 3:
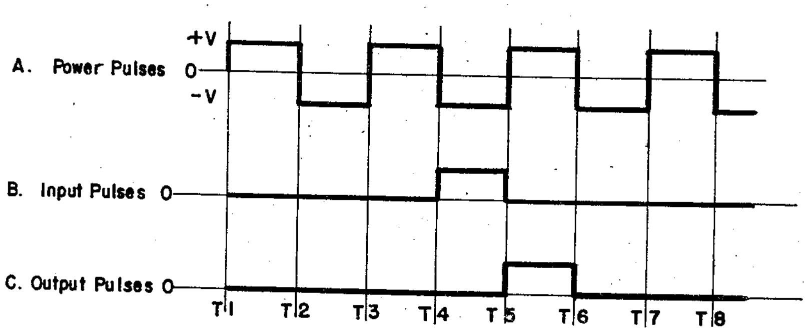
Figure 3 (A, B and C) are wave forms illustrating the operation of the non-complementing magnetic amplifier shown in Figure 2.

Referring now to the circuit shown in Figure 2, and making reference to the wave form diagrams of Figure 3 (A through C), it will be seen that a non-complementing amplifier that may be used in the present invention utilizes a magnetic core 20 preferably exhibiting a hysteresis loop substantially the same as that shown in Figure 1. The core 20 carries two windings thereon, namely, a power or output winding 21 and a signal or input winding 22. One end of the power winding 21 is coupled through a diode D1, poled as shown, to a source of positive and negative going power pulses such as is shown in Figure 3A. For the purposes of the following discussion, the power pulses are assumed to have a center value of "0" volts and to exhibit excursions between plus and minus V volts. Assuming now that the core 20 is initially at −B*r*, point 12 of Figure 1, application of a positive going power pulse during the time *t1* to *t2*, at power input terminal 23, will cause a current to flow through the diode D1 to winding 21 and thence through resistor RL, to ground. Inasmuch as this energy is for the most part expended in flipping the core from −B*r* (point 12 of Figure 1) to plus B*r* (point 10 of Figure 1), only a very small output at best will appear across the load resistor RL. This small output is termed a sneak output and is effectively suppressed by the combination of resistor R1 and diode D3 connected as shown. This suppression is effected by so choosing the magnitude of resistor R1 that a current flows through the said diode D3 and the resistor R1 to the source of negative potential, −V, which current is equal to or greater than the magnitude of the sneak pulse current to be suppressed. Because of the operation of diode D3 and resistor R1 therefore, only outputs larger than that of the sneak output may appear at output 24.

Summarizing the foregoing, therefore, during the time *t*1 to *t*2 the applied positive going power pulse merely succeeds in flipping the core from —B*r* to plus B*r*, and due to the sneak suppression by diode D3 and resistor R1, no output will appear at terminal 24. During the period *t*2 to *t*3, a negative going power pulse is applied to terminal 23 and this applied pulse effectively causes diode D1 to cut off. During this period of time, a reverse current flows through the power winding 21 from ground through diode D3, through the said winding 21 and thence through resistor R2 to the source of negative potential —V. The value of this current is substantially $$\frac{V}{R2}$$

and R2 is so chosen that the current flow in the reverse direction through coil 21 is sufficient to flip the core during the time period *t*2 to *t*3 from plus B*r* back to —B*r* in a counterclockwise direction. Thus, at time *t*3, the core once more finds itself at the —B*r* operating point and a further positive going power pulse applied at terminal 23 during the time *t*3 to *t*4 will again merely flip the core to the plus B*r* point without effecting an output. Thus, in the absence of any other input signals the core is regularly flipped between —B*r* and plus B*r* and back to —B*r* without there being any output.

If we should now assume that an input pulse, as shown in Figure 3B, should be applied to input terminal 25 during the time period *t*4 to *t*5, this input pulse will flow through the winding 22 and will subject the core 20 to a supplemental magnetizing force. As will become apparent from an examination of the winding directions shown in Figure 2, the magnetizing force effected by coil 22 during the time *t*4 to *t*5 is in a direction opposite to that effected by the reverse current flow through coil 21 during this same time period. The magnetizing effect of the said reverse current flow through winding 21 is thereby effectively nullified and therefore at the end of the *t*4 to *t*5 time period the core remains at the operating point plus B*r*. Application of a further positive going power pulse during the time *t*5 to *t*6 will therefore cause a substantial output to appear across load resistor RL, and at output terminal 24. If no further input pulse should be applied during the time *t*6 to *t*7 the reverse current flow through winding 21 will again cause the core to flip back to the —B*r* point, no output will appear during the time *t*7 to *t*8, etc. Thus the arrangement shown in Figure 2 permits an output to appear across resistor RL during the application of a positive going power pulse only if an input were applied at the terminal 25 during the next preceding negative going power pulse.

One other design consideration should be noted. Current flow through the winding 21 will, in the absence of other circumstances, establish flux changes tending to induce a voltage in the signal input coil 22. In order to protect the input circuit connected to diode D2 against any interference from current flowing in the power winding 21, the signal winding 22 is returned to a positive voltage plus E, as shown, which is equal and opposite in value to the voltage induced or generated in it by current flowing in the power winding 21 when reverse current flows through the said winding 21.

Figure 4:
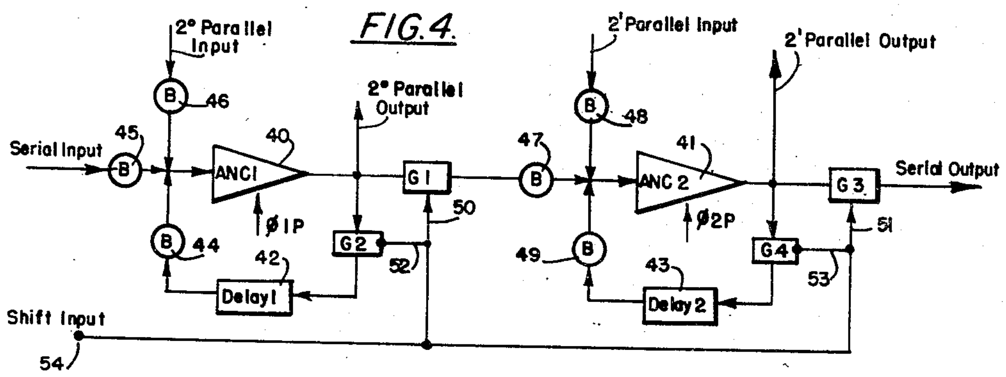
Figure 4 is a logical representation of a simple shift register constructed in accordance with my invention and utilizing non-complementing amplifiers of the magnetic type.
Figure 4:
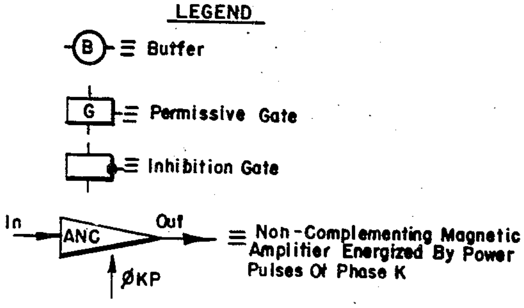

The non-complementing amplifier shown in Figure 2 may readily be utilized to form a simple bistable device and such bistable devices may in turn be interconnected to effect a shifting register in accordance with the present invention. One such embodiment in accordance with my invention is shown in Figure 4. The bistable stages of this embodiment comprise non-complementing amplifiers 40 and 41, each of which has its output selectively fed back to its input through recirculation gates G2 or G4, and delay means 42 and 43 respectively. Buffers 44, 45, 46, 47, 48, and 49 are also provided as shown. In addition, the bistable device utilizing magnetic amplifier 40 is connected to the next following bistable device through a transfer gate G1 and the bistable device comprising non-complementing amplifier 41 is in turn fed to the next following bistable stage through a further transfer gate G3, etc. The gates G1, G2, G3 and G4 are of types well known in the art, gates G1 and G3 being normally closed unless a signal appears on lines 50 or 51 respectively, and gates G2 and G4 being normally open unless, once more, a signal appears on line 52 or 53 respectively. It should further be noted that due to the different characters, for instance, of gates G1 and G2, voltage polarity inverting means should be interposed in the lines 50 and 51 or in the lines 52 and 53 whereby a shift input pulse of a given polarity appearing at input terminal 54 will establish the required opposite effects on gates G1 and G2; and on G3 and G4, etc. Such inverter means are well known to those skilled in the art and have not been shown in the circuit of Figure 4 for simplicity of representation.

Figure 5:
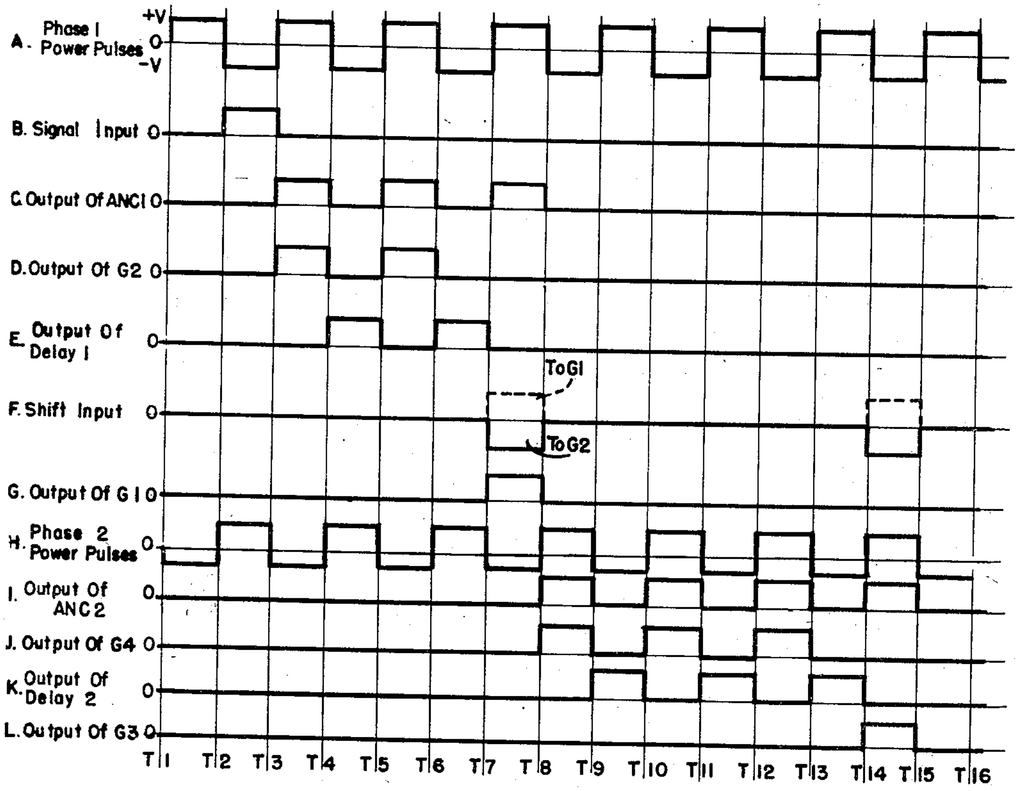
Figure 5 (A through L inclusive) are wave forms illustrating the operation of the shifting register shown in Figure 4.

Referring now to the operation of the shifting register shown in Figure 4, and making reference to the wave froms A through L of Figure 5, we will initially assume that each of the bistable stages is in a clear state, namely, no output is being produced by any of these stages. If a signal input (Figure 5B) should now be applied during the time *t*2 to *t*3, through either buffer 45 or buffer 46 in coincidence with the negative going portion of a phase 1 power pulse (Figure 5A), the non-complementing amplifier 40 will produce an output pulse during the time *t*3 to *t*4. Inasmuch as no shift pulse has been applied from terminal 54 via line 52 to the gate G2 during this said time period, the gate G2 will be open and will also have an output during this time *t*3 to *t*4, which output is fed to the input of delay means 42. The delay shown in the feedback loop is equal to one-half of the power pulse period and is used simply to store the output of non-complementing amplifier 40 which occurs during the positive going portion of the phase 1 power pulse until the signal half cycle (negative going portion) of the phase 1 power pulse occurs. Operation is possible for delays of (2N plus one) half periods, where N is any integer, but here $N=0$ has been chosen as convenient. If N does not equal zero, it should be noted that the output pulse frequency will be the power pulse frequency divided by 2N, and the maximum rate at which shift pulses may be applied will also be divided by 2N. Further, the delay can be active, as applied perhaps by another non-complementing amplifier (see Figure 8 for instance), or passive using for example a lumped constant delay line. Because of the delay interposed by delay means 42, an output from the said delay means 42 is passed through buffer 44 during the time *t*4 to *t*5; as will be seen, this output occurs again during a negative going portion of a phase 1 power pulse and therefore acts as a further input to non-complementing amplifier 40 whereby the non-complementing amplifier 40 produces a further output during the period *t*5 to *t*6, and the cycle of operation is repeated. Thus a signal input through the buffers 45 or 46 has caused the bistable stage utilizing non-complementing amplifier to switch from its non-output producing condition to its recirculating condition; and this state of operation will continue until a shift input appears at terminal 54. Such a shift input has been shown in Figure 5F, and this signal has been represented as a negative going portion as well as a positive going dotted portion to take into account the required inversion of signal inputs to the gates G1 and G2. The shift input pulse appearing on line 52 causes gate G2 to close, thus breaking the feedback path to the input of non-complementing amplifier 40 and stopping outputs therefrom. The shift input pulse appearing on line 50 opens gate G1 and therefore an output appears from the said gate G1 during the time $t7$ to $t8$, as shown. This output, as may be seen from Figures 5G and 5H, occurs during the negative going portion of a phase 2 power pulse and therefore acts as a signal input to the further non-complementing amplifier 41 (which is energized by phase 2 power pulses) whereby the bistable stage incorporating non-complementing amplifier 41 assumes its recirculating condition in accordance with the preceding discussion. A further shift input pulse occurring during the time $t14$ to $t15$ will again be fed via line 53 to gate G4 breaking the feedback loop to the input of non-complementing amplifier 41 and causing it to revert to its non-recirculating condition. The shift input pulse applied via line 51 during time $t14$ to $t15$ also opens gate G3 permitting an output from the said gate G3 during the time $t14$ to $t15$ whereby an input may be applied to the next succeeding bistable stage. The output of gate G3 again occurs during the negative going portion of a phase 1 power pulse so that the next succeeding bistable stage should again have its non-complementing amplifier energized by such phase 1 power pulses.

Thus by way of summary, assuming that each stage of the shifting register is originally clear, an input pulse to the first stage causes it to assume a recirculating condition and a shift pulse input at terminal 54 causes this recirculation of the first stage to cease and the second stage to commence its recirculating condition. Further shift input pulses will similarly cause succeeding stages of the shifting register to be switched to their recirculating conditions in sequence. Thus, once information has been applied to the first stage of the shifting register shown in Figure 4, successive shift input signals will cause this information to be successively shifted down the chain of bistable devices.

It should also be noted that by utilizing the serial and parallel inputs, and the serial and parallel outputs, as shown in Figure 4, the shifting register of Figure 4 easily accomplishes serial to parallel and parallel to serial conversions. Again, it should be noted that any number of stages can be used in the practice of my invention and that a closed loop composed of an even number of stages can be used as a ring counter.

Figure 8:
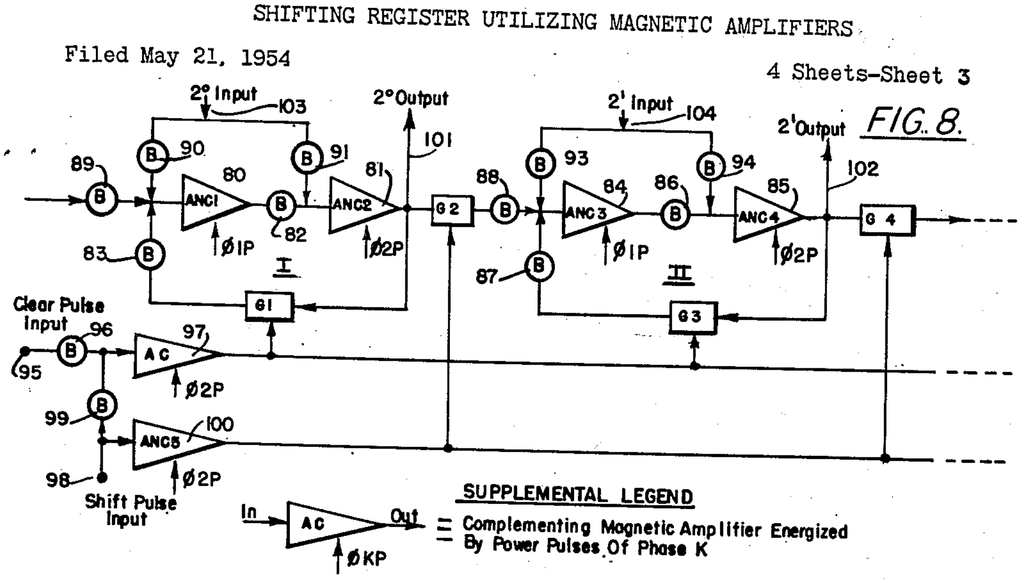
Figure 8 is a logical representation of a further form of shifting register in accordance with the present invention utilizing non-complementing amplifiers in the several bistable stages of my shifting register, as well as further magnetic amplifiers including a complementing magnetic amplifier in the clear pulse and shift pulse input network.
Figure 10:
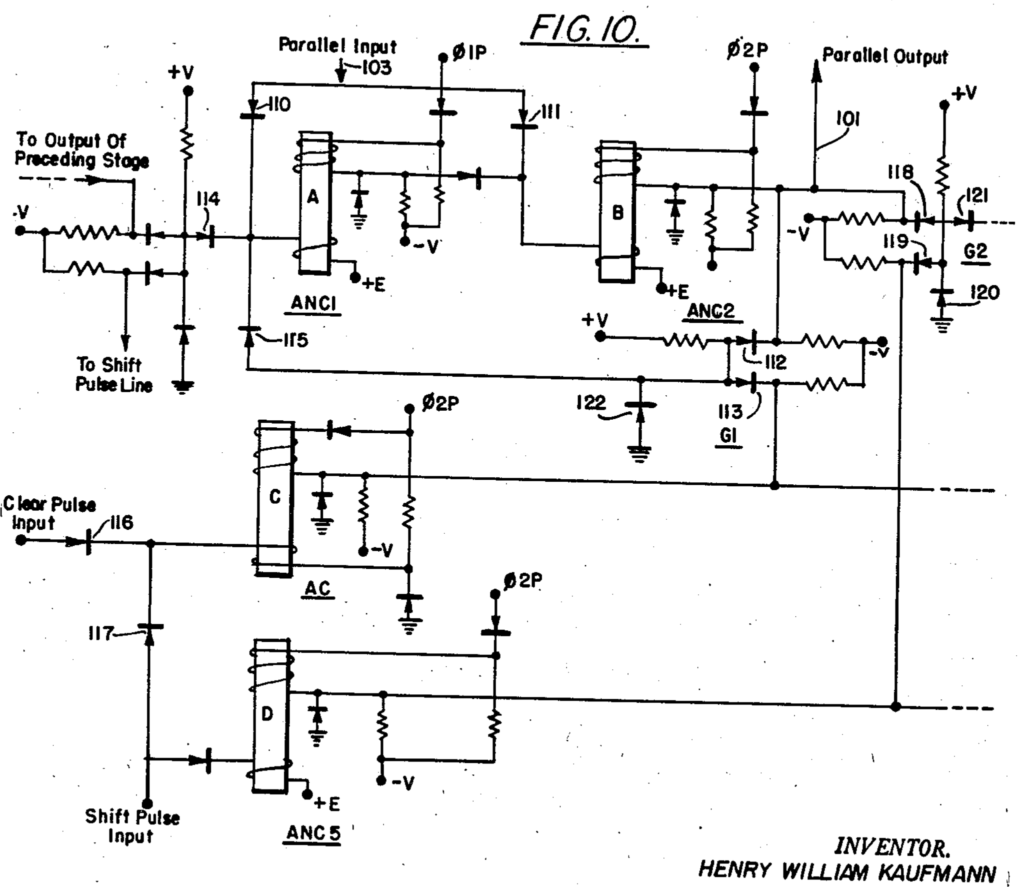
Figure 10 is a schematic representation of one stage of the shifting register shown in Figure 8 illustrating the interconnection of the several gates and magnetic amplifiers utilized.

A further shifting register derived from that of Figure 4 is shown in Figures 8 and 10. Before proceeding with a discussion of these figures however it will be desirable to discuss the operation of a complementing magnetic amplifier inasmuch as such an amplifier is utilized in the control pulse network of this latter form of shifting register.

Figure 7:
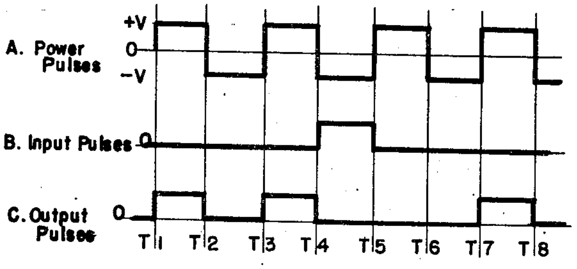
Figure 7 (A, B and C) are wave forms illustrating the operation of the complementing amplifier shown in Figure 6.

Referring to Figures 6 and 7, it will be seen that a complementing magnetic amplifier that may be used in the present invention, comprises a core 60 preferably but not necessarily exhibiting a hysteresis loop similar to that discussed in reference to Figure 1. The core 60 bears two windings thereon, namely, winding 61 which is again termed the power or output winding, and a signal or input winding 62. One end of the power winding 61 is coupled to a diode D1 poled as shown and the plate of diode D1 is in turn connected to an input terminal 63 supplied with a train of positive and negative going power pulses such as is shown in Figure 7A. The power pulses again are shown to have a center value of "0" volts and to exhibit excursions between plus and minus V volts. Assuming now that the core is initially at plus remanence (point 10 of Figure 1) a positive going power pulse applied at terminal 63 during the time $t1$ to $t2$ will cause current to pass through the diode D1, through the relatively low impedance exhibited by power winding 61 and thence through diode D4 and load resistor RL. Because of the low impedance exhibited by coil 61, a substantial output pulse will appear at the terminal 64 during the time $t1$ to $t2$. At time $t2$, and in the absence of any signal input, the core will return to the operating point 10 (shown in Figure 1) and the next positive going power pulse applied during the time $t3$ to $t4$, for instance, will again drive the core to plus saturation, again giving an output during this time $t3$ to $t4$. Thus, in the absence of any other inputs, if the core 60 should initially be at plus remanence, successive positive going power pulses will cause successive outputs to appear at terminal 64.

Let us now assume, however, that an input pulse is applied during the time $t4$ to $t5$, such as is shown in Figure 7B. This input pulse causes current to pass through the diode D2 and through coil 62 and, as will be noted from Figure 6, inasmuch as the said coil 62 is wound in a direction opposite to that of coil 61, the said input pulse will effect a minus H magnetizing force on the core 60. Thus, during the time $t4$ to $t5$, the application of an input pulse as described will cause the core 60 to be flipped in a counterclockwise direction from the plus remanence point to the region of the minus remanence point (point 10, to point 15, to point 12 of Figure 1) and at time $t5$ the core 60 will find itself at the operating point 12, minus $Br$, preparatory to the reception of the next positive going power pulse applied during the time $t5$ to $t6$. This next positive going power pulse will thus find the coil 61 to present a relatively high impedance and as a result substantially all of the energy presented by the power pulse will be expended in flipping the core back to the region of point 10 (plus $Br$), rather than in producing a usable output. Thus, as will be seen from an examination of Figure 7, the application of an input pulse during the occurrence of a negative going portion of the applied power pulses will effectively prevent the output of a usable pulse during the next succeeding positive going power pulse. The system thus acts as a complementer.

While the foregoing discussion has described in essence the operation of a complementing magnetic amplifier that may be used in the present invention, several further design considerations should be noted. First of all, sneak outputs will tend to occur, as was discussed in reference to the circuit of Figure 2, and these sneak outputs are once more effectively suppressed by the combination of resistor R1 and diode D3 as shown in Figure 6, and as discussed in reference to Figure 2. Again, the passage of energy through power coil 61 due to the application of a positive going power pulse at the terminal 63, will cause a flux change to occur in the coil 61 as described and this flux change will in turn tend to induce a voltage in the signal coil 62. This induced voltage is negative at the cathode of D2 and positive at the cathode of D5, and, although the induced voltage is small, if the core is at point 10 (plus $Br$) when the positive going power pulse is applied, it is nevertheless necessary to prevent current from flowing in the signal winding 62 due to this small induced voltage. The combination of resistor R2 and diode D5 accomplishes this function by allowing the lower end of signal winding 62, connected to the junction of the said resistor R2 and diode D5, to attain the power pulse potential when the power pulse is positive. Since the base level of an input pulse, as applied through diode D2 is "0" volts, no current can now flow due to the small induced voltage discussed previously. Further, if the core 60 should initially be at $-Br$ upon application of a positive going power pulse, a relatively large flux change occurs in the core and a relatively large voltage will be induced in the lower winding 62. The blocking action of the R2—D5 circuit still prevents current from flowing in the said lower winding 62 if there are fewer turns on signal winding 62 than are on power winding 61. It is well known in the art that this relationship between the number of turns on the windings must exist if a voltage gain is to be produced by the amplifier.

Finally, it should be noted that when a power pulse, such as is shown in Figure 7A, is negative going, only a negligible current can flow in diode D1. In this respect it has been assumed that the back resistance of the several diodes shown is infinite and that the forward resistance is zero. While this is not strictly true, these assumptions are convenient and do not substantially affect the explanation. Even though no current flows through the diode D1 during application of a negative going portion of the power pulse, current flows in the R2—D5 circuit, the magnitude of this current being approximately $$\frac{V}{R2}$$

This current serves to hold the end of signal winding 62 connected to the junction of resistor R2 and diode D5 at approximately ground potential, and as a result signal inputs applied through the diode D2 during a negative going power pulse portion pass through the said diode D2, through winding 62 as previously discussed, to the junction of resistor R2 and diode D5, which junction is approximately at ground potential. It should further be noted that the current which flows as a result of an input pulse through diode D2 must produce sufficient magnetizing force to flip core 60 from plus remanence to minus remanence during the input pulse period. This value of current must not exceed the magnitude $$\frac{V}{R2}$$

but this condition is easily arranged by proper choice of resistor R2.

Summarizing the foregoing briefly, it will be seen that the circuitry of Figure 6 provides a complementing magnetic amplifier wherein outputs will appear from the said amplifier so long as no input signal is presented thereto during negative going portions of the power pulses applied. This complementing magnetic amplifier is utilized in a portion of the circuit shown in Figures 8 and 10.

In the particular embodiment of my invention shown in Figures 8 and 10, the delay afforded by the delay lines 42 and 43 of Figure 4 is provided by a further non-complementing magnetic amplifier. The system of Figure 8 further allows simultaneous parallel inputs of either phase 1 or phase 2 signals and further allows the possibility of buffing the outputs of the two non-complementing amplifiers of each bistable stage together to obtain a "D. C.," or "full wave," output. In this respect it will, for instance, be noted from the subsequent discussion that the outputs of the said two non-complementing amplifiers for each bistable stage occur respectively in successive time periods so that if these outputs are buffed together to the ultimate output of the stage, this ultimate output would appear substantially as either a D. C. level greater than zero or as a "0" signal output. The device of Figure 8 further permits the recirculation gates G1, G3, etc., to be driven independently of the transfer gates G2, G4, etc., whereby all the stages may be cleared to zero simultaneously. As will be noted from the following discussion, for instance, a shift input pulse closes all of the recirculation gates and opens all of the transfer gates, thus both clearing and shifting while a clear pulse input merely closes all the recirculation gates thus clearing all stages to zero.

Figure 9:
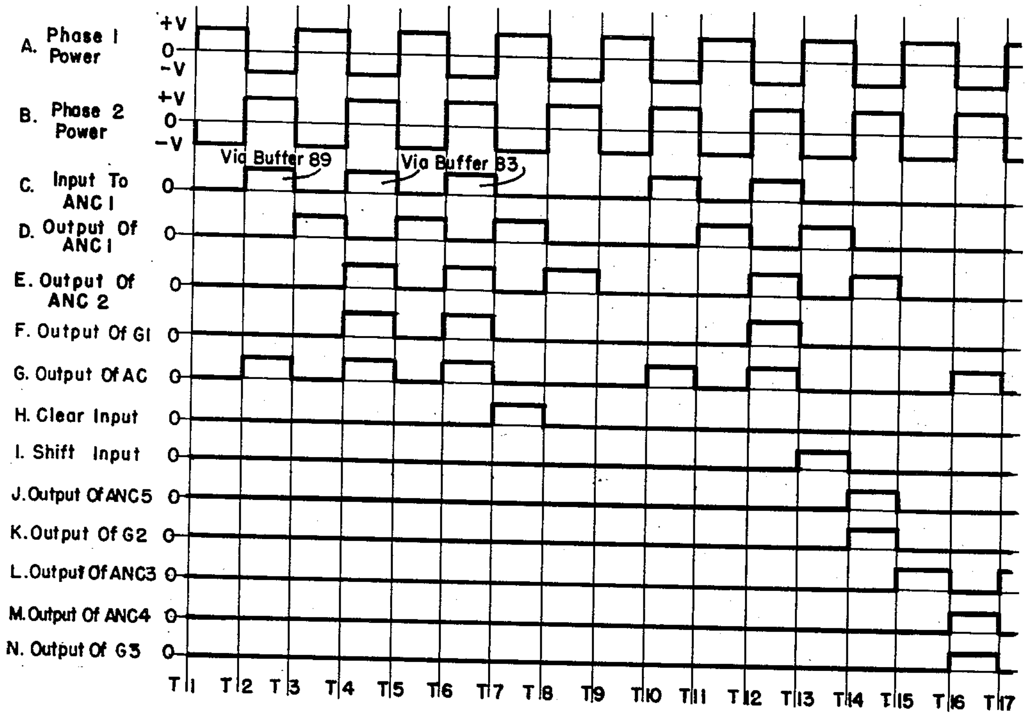
Figure 9 (A through N inclusive) are wave forms illustrating the operation of the shifting register shown in Figure 8.

Referring now to Figure 8 and the explanatory wave forms shown in Figure 9, it will be seen that each bistable stage of my modified shifting register comprises two non-complementing amplifiers connected in series, the output of the second of said non-complementing amplifiers being fed back through a recirculation gate to the input of the first of said non-complementing amplifiers. Thus one stage of my shifting register comprises non-complementing magnetic amplifiers 80 and 81, the output of amplifier 80 being coupled through buffer 82 to the input of amplifier 81. The output of amplifier 81 is fed to a recirculation gate G1, the output of which is in turn connected to the input of amplifier 80 through a buffer 83. The second bistable stage comprises similar components, namely, non-complementing amplifiers 84 and 85, buffers 86 and 87, and recirculation gate G3. The output of the first bistable stage is selectively coupled through a transfer gate G2 and a buffer 88 to the input of the second bistable stage and the output of this second bistable stage is in turn selectively coupled through a further transfer gate G4 to the next succeeding bistable stage, etc. Provision is made for either a serial input to the first stage through a buffer 89, or for a parallel input through buffers 90 and 91. Further, inasmuch as buffers 90 and 91 are connected to the first bistable stage as shown, either phase 1 or phase 2 inputs may be supplied thereto as will become apparent from the following discussion. Similar parallel input pulses of either phase1 or phase 2 may be supplied to the second bistable stage through buffers 93 and 94. The control signal for the shifting register of Figure 8 is provided through a buffer 96 to the input of complementing amplifier 97, or, in the alternative, by a source of shift pulses 98 coupled to the said complementing amplifier 97 through a buffer 99 and also coupled directly to a further non-complementing amplifier 100. Non-complementing amplifiers 80 and 84 are supplied by phase 1 power pulses and non-complementing amplifiers 81, 85, and 100 and complementing amplifier 97 are energized by phase 2 power pulses.

The operation of the circuit of Figure 8 will become readily apparent from a consideration of wave forms shown in Figure 9. If it be assumed that the bistable stages, I, II, etc., are originally in a non-recirculating condition, no signals will appear at any of the output lines 101, 102, etc. If an input pulse should now be applied through buffer 89 during the time $t2$ to $t3$ (Figure 9C), this input pulse, occurring as it does during a negative going portion of a phase 1 power pulse causes amplifier 80 to have an output during the time $t3$ to $t4$ (Figure 9D). This output is in turn coupled through buffer 82 to the input of amplifier 81 which, inasmuch as it is energized by phase 2 power pulses, will give a further output during the time period $t4$ to $t5$ (Figure 9E). Complementing amplifier 97 normally produces output throughout these operations (Figure 9G). Inasmuch as no input pulses are present on either clear terminal 95 or at shift terminal 98, the output of complementing amplifier 97 is fed to each of gates G1, G3, etc., in the recirculation paths of each of the bistable stages I, II, etc., whereby these recirculation paths are, in the absence of any clear or shift pulse inputs, normally open. As a result, the output of noncomplementing amplifier 81 during the $t4$ to $t5$ time period is fed through the gate G1 (Figure 9F) and thence through buffer 83 back to the input of non-complementing amplifier 80. This further input during $t4$ to $t5$ thus acts exactly as did the original input signal through buffer 89, and non-complementing amplifier 80 produces a further output pulse during the period $t5$ to $t6$ which in turn causes still another output pulse from amplifier 81 during the period $t6$ to $t7$, etc.

If now a clear pulse input appears at terminal 95 during the time period $t7$ to $t8$ (Figure 9H), this pulse is coupled through the buffer 96 to the input of complementing amplifier 97 causing the said amplifier 97 to cease producing outputs. As a result, gate G1 is closed during the period $t8$ to $t9$ for instance whereby no output pulse from amplifier 81 may be fed therethrough and the recirculation of bistable stage I stops. It should also be noted that the clear pulse input causes each of the recirculation gates G1, G3, etc., to be closed so that if any other stage of the shifting register were in a recirculating condition, this recirculation would in turn be halted. Thus, all stages are cleared to "0" simultaneously by the application of a pulse at terminal 95.

If now a further input pulse should appear during the time $t10$ to $t11$ (Figure 9C), this input pulse will be fed through the buffer 89 and the recirculation will once more start. If now a shift input pulse should be applied to the terminal 98 during $t13$ to $t14$ (Figure 9I), this shift input pulse will be fed both to non-complementing amplifier 100 and via buffer 99 to complementing amplifier 97. Amplifier 97 will, as before, cease producing outputs whereby the recirculation gates are closed. Non-complementing amplifier 100 will, on the other hand, produce an output (Figure 9J) during the time period *t14* to *t15* which will cause gate G2, for instance, to be opened during this time period *t14* to *t15*, providing an input pulse via buffer 88 to the input of bistable stage II. Bistable stage II is exactly the same as bistable stage I and as a result the input pulse through buffer 88 will cause bistable stage 11 to assume its recirculating condition (Figure 9L, M, and N). Thus the application of a shift pulse input at terminal 98 at a time when bistable stage I was in a recirculating condition causes the said bistable stage to revert to a non-recirculating condition and passes an input to the next succeeding bistable stage II causing it to assume a recirculating condition. The shift pulse input has thus caused the information to move from bistable stage I to the next bistable stage II. Further shift pulse inputs will cause the information to be progressively moved down the shifting register and this action will continue until the information is shifted out of the register or until a clear pulse input is applied which will simultaneously clear all stages to "0," as described above. As will be noted from an examination of Figures 9C and D, a phase 1 serial input through buffer 89, during the time *t2* to *t3* causes a phase 2 pulse input to be applied to non-complementing amplifier 81 during the time period *t3* to *t4*. This occurs whether the phase 1 input is applied through buffer 89 or through buffer 90 from the parallel input 103. The same situation would occur if a phase 2 input were applied during the time period *t3* to *t4* at parallel input 103 inasmuch as this phase 2 input would be fed via buffer 91 to the input of non-complementing amplifier 81 and would cause the same recirculation condition to start, precisely the same as if the phase 2 pulse appearing at the output of non-complementing amplifier 80 during the time *t3* to *t4* had in fact come from the parallel input 103 via buffer 91. Thus either phase 1 or phase 2 inputs may be supplied at the parallel input 103; phase 1 inputs causing the cycle of operation to start from non-complementing amplifier 80, while phase 2 inputs cause the cycle of operation to start from non-complementing amplifier 81. Similar considerations are present in the bistable stage II whereby either phase 1 or phase 2 inputs may be applied to the parallel input 104. Again, it must be emphasized that either of the two non-complementing amplifiers comprising each bistable stage may be replaced by suitable delay means of the passive type. This will become readily apparent from an examination, for instance, of Figures 9C and 9D, or Figures 9D and E, wherein it is shown that the effect of either non-complementing amplifier 80 or of non-complementing amplifier 81 is merely to delay a pulse appearing at the input for one time period so that pulses occurring at an input of one amplifier during the positive going power pulse portion of the next amplifier will be delayed until the occurrence of a negative going power pulse at the said next amplifier.

Figure 10 represents a schematic of one bistable stage of the shifting register shown in Figure 8 and includes schematic representations of the complementing amplifier 97 and non-complementing amplifier 100 which provide the clear and shift pulse controls. The individual circuits of Figure 10 are precisely the same as those discussed in reference to Figures 2 and 6, and Figure 10 is presented to illustrate the manner in which these individual circuits may be interconnected to provide the shifting register of Figure 8. Comparing the showings of Figures 8 and 10, it will be seen that the magnetic amplifier having core A corresponds to non-complementing amplifier 80, magnetic amplifier having core B corresponds to non-complementing amplifier 81, the magnetic amplifier having core C corresponds to complementing amplifier 97, and the magnetic amplifier having core D corresponds to non-complementing amplifier 100. Diodes 110 and 111 correspond respectively to buffers 90 and 91; diodes 112 and 113, clamping diodes 122, and their associated resistors, correspond to gate G1; diodes 114 and 115 correspond respectively to buffers 89 and 83; diodes 116 and 117 correspond respectively to buffers 96 and 99; diodes 118 and 119 and clamping diode 120, and their associated resistances, correspond to transfer gate G2; and diode 121 corresponds to buffer 88.

The operation of the schematic shown in Figure 10 is as described with reference to Figure 8, and in particular as was individually discussed with reference to Figures 2 and 6.

While I have attempted to describe several particular embodiments of my invention, many variations will readily suggest themselves to those skilled in the art. In particular, the precise complementing and non-complementing magnetic amplifiers shown are merely illustrative and these amplifiers may in fact take a number of different forms which are all within the scope of the present invention. In this respect, for instance, reference is made to the co-pending application of Theodore H. Bonn and Robert D. Torrey, Serial No. 402,858, filed January 8, 1954, for "Signal Translating Device"; and the co-pending application of John Presper Eckert, Jr., and Theodore H. Bonn, Serial No. 382,180, filed September 24, 1953, for "Signal Translating Device." Each of the foregoing applications has been assigned to the assignee of the instant application, and they each disclose additional forms of magnetic amplifiers which may be readily applied in the practice of the instant invention.

Having thus described my invention, I claim:

1. A shifting register comprising a plurality of magnetic amplifier stages, each of said stages including a feedback loop from the output to the input thereof, a plurality of normally closed transfer gates interposed between said stages, and control means for selectively breaking said feedback loops and for selectively opening said transfer gates.

2. A shifting register comprising a plurality of chain connected bistable stages, each of said stages including a magnetic amplifier, feedback means for selectively passing energy from the output to the input of said magnetic amplifier, said feedback means including recirculation gate means and delay means, a plurality of normally closed transfer gates respectively interconnecting said bistable stages, and control means coupled to said recirculation gates and to said transfer gates for selectively closing said recirculation gates and for selectively opening said transfer gates.

3. The shifting register of claim 2 in which said delay means comprises a further magnetic amplifier.

4. A shifting register comprising a plurality of bistable stages, each of said bistable stages comprising a first non-complementing magnetic amplifier, and a feedback loop comprising a recirculation gate and delay means for selectively feeding energy from the output to the input of said first non-complementing magnetic amplifier, a plurality of transfer gates for selectively coupling the output of each of said bistable stages to the input of a further bistable stage, and pulse control means coupled to said recirculation gates and to said transfer gates for selectively closing each of said recirculation gates and for selectively opening each of said transfer gates.

5. The shifting register of claim 4 in which each of said delay means comprises a second non-complementing magnetic amplifier, first power pulse means coupled to each of said first amplifiers for energizing said first amplifiers with power pulses of a first phase, and second power pulse means coupled to each of said second amplifiers for energizing said second amplifiers with pulses of a second phase.

6. A shifting register comprising a plurality of chain connected non-complementing magnetic amplifiers, a feedback loop for each of said amplifiers, control means for selectively breaking each of said feedback loops, a plurality of transfer gates, said magnetic amplifiers being chain connected through transfer gates, said control means including means for opening said transfer gates simultaneous with the breaking of said feedback loops.

7. The shifting register of claim 4 including buffer means coupled to each of said bistable stages for selectively feeding a signal input to plural points in each of said bistable stages.

8. A shifting register comprising a plurality of bistable stages, each of said stages comprising an amplifier having a feedback loop from the output to the input of said amplifier, a plurality of normally closed transfer gates respectively interposed between said stages, and selective control means for simultaneously breaking each of said feedback loops and for opening each of said transfer gates.

9. The shifting register of claim 8 wherein each of said amplifiers comprises a magnetic amplifier.

10. The shifting register of claim 8 wherein each of said feedback loops includes a normally open recirculation gate, said control means comprising pulse means coupled to said recirculation gates and to said transfer gates.

11. A shifting register comprising a plurality of bistable stages, each of said stages comprising a pulse type amplifier including a recirculation path from the output to the input of said amplifier whereby the bistable states of each said stages are characterized respectively by the presence or absence of pulses in said recirculation path, a plurality of normally closed transfer gates respectively interposed between said bistable stages, and control means for simultaneously opening each of said transfer gates and each of said recirculation paths.

12. A shifting register comprising a plurality of bistable stages, each of said stages including magnetic amplifier means for producing either of two stable output states one of which states is characterized by a succession of pulses at the output of said stage and the other of which states is characterized by substantial absence of pulses at the output of said stage, normally closed gate means between said bistable stages for connecting said stages in a chain, and control means for selectively enabling said gate means thereby to transfer at least one of said succession of pulses from any of said bistable stages having said one stable output state to the input of the next successive stage in said chain, said control means including means operative to switch any of said bistable stages having said one stable output state to said other stable output state.

13. In combination, a bistable stage comprising a pulse type amplifier including recirculation means between the output and input thereof whereby the bistable states of said stage are characterized respectively by the presence and absence of pulses at the output of said stage, a further pulse type amplifier, a normally closed transfer gate between the output of said bistable stage and the input of said further amplifier, and control means for simultaneously opening said recirculation means and enabling said transfer gate whereby said control means is operative, when said bistable stage is in its pulse producing stable state, to switch said stage to its non-pulse producing state and simultaneously to transfer a pulse from said stage via said enabled transfer gate to the input of said further pulse type amplifier.

14. A shifting register comprising a plurality of chain-connected bistable stages, each of said stages including a magnetic amplifier, feedback means for selectively passing energy from the output to the input of said magnetic amplifier, said feedback means including recirculation gate means and delay means comprising a further magnetic amplifier, a plurality of normally closed transfer gates respectively interconnecting said bistable stages, and control means coupled to said recirculation gates and to said transfer gates for selectively closing said recirculation gates and for selectively opening said transfer gates, said control means including a complementing magnetic amplifier coupled to each of said recirculation gates.

15. The shifting register of claim 14 in which said control means further includes a non-complementing magnetic amplifier coupled to each of said transfer gates.

16. A shifting register comprising a plurality of bistable stages, each of said bistable stages comprising a first non-complementing magnetic amplifier, and a feedback loop comprising a recirculation gate and delay means for selectively feeding energy from the output to the input of said first non-complementing magnetic amplifier, a plurality of transfer gates for selectively coupling the output of each of said bistable stages to the input of a further bistable stage, and pulse control means coupled to said recirculation gates and to said transfer gates for selectively closing each of said recirculation gates and for selectively opening each of said transfer gates, said pulse control means comprising a complementing magnetic amplifier, a source of clear pulses selectively coupled to the input of the said complementing magnetic amplifier, the output of said complementing magnetic amplifier being coupled to each of said recirculation gates whereby, in the absence of a clear pulse input to the said complementing magnetic amplifier, the output of said complementing magnetic amplifier maintains each of said recirculation gates in a normally open condition.

17. The shifting register of claim 16 in which said pulse control means comprises a further non-complementing magnetic amplifier, a source of shift pulses coupled selectively to the inputs both of said further non-complementing amplifier and of said complementing magnetic amplifier, the output of said further non-complementing magnetic amplifier being coupled to each of said transfer gates.

18. The shifting register of claim 17 in which each of said magnetic amplifiers comprises a core of magnetic material exhibiting a substantially rectangular hysteresis loop, a first coil on said core for selectively receiving inputs to the amplifier, and a second coil on the said core for selectively effecting outputs from the amplifier.

19. A shifting register comprising a plurality of bistable stages, each of said bistable stages comprising a first non-complementing magnetic amplifier, and a feedback loop comprising a recirculation gate and delay means for selectively feeding energy from the output to the input of said first non-complementing magnetic amplifier, a plurality of transfer gates for selectively coupling the output of each of said bistable stages to the input of a further bistable stage, pulse control means coupled to said recirculation gates and to said transfer gates for selectively closing each of said recirculation gates and for selectively opening each of said transfer gates, and buffer means coupled to each of said bistable stages for selectively feeding signal inputs to plural points in each of said bistable stages, said buffer means being coupled both to the input of said first non-complementing amplifier and to the input end of said delay means, whereby a signal input is coupled to both said first amplifier and to said delay means.

20. The shifting register of claim 19 in which said delay means comprises a second non-complementing magnetic amplifier, and means energizing said first and second non-complementing amplifiers in each of said bistable stages with power pulses respectively of differing phases, whereby a signal input through said buffer means will be accepted by one only of said first and second amplifiers dependent upon the time of application of said signal input.

References Cited in the file of this patent

UNITED STATES PATENTS 2,710,952 Steagall ---------------- June 14, 1955

OTHER REFERENCES

Publication I, Electronics, January 1951, 340-174.6 (pp. 108-111).

Publication II. Proc. Assoc. Comp. Mach., May 2, 1952, 340-174.6 (pp. 207-212).